Feb. 13, 1934.  V. B. GAY  1,947,258
METHOD AND APPARATUS FOR FORMING TIRES
Filed May 3, 1932  2 Sheets-Sheet 2
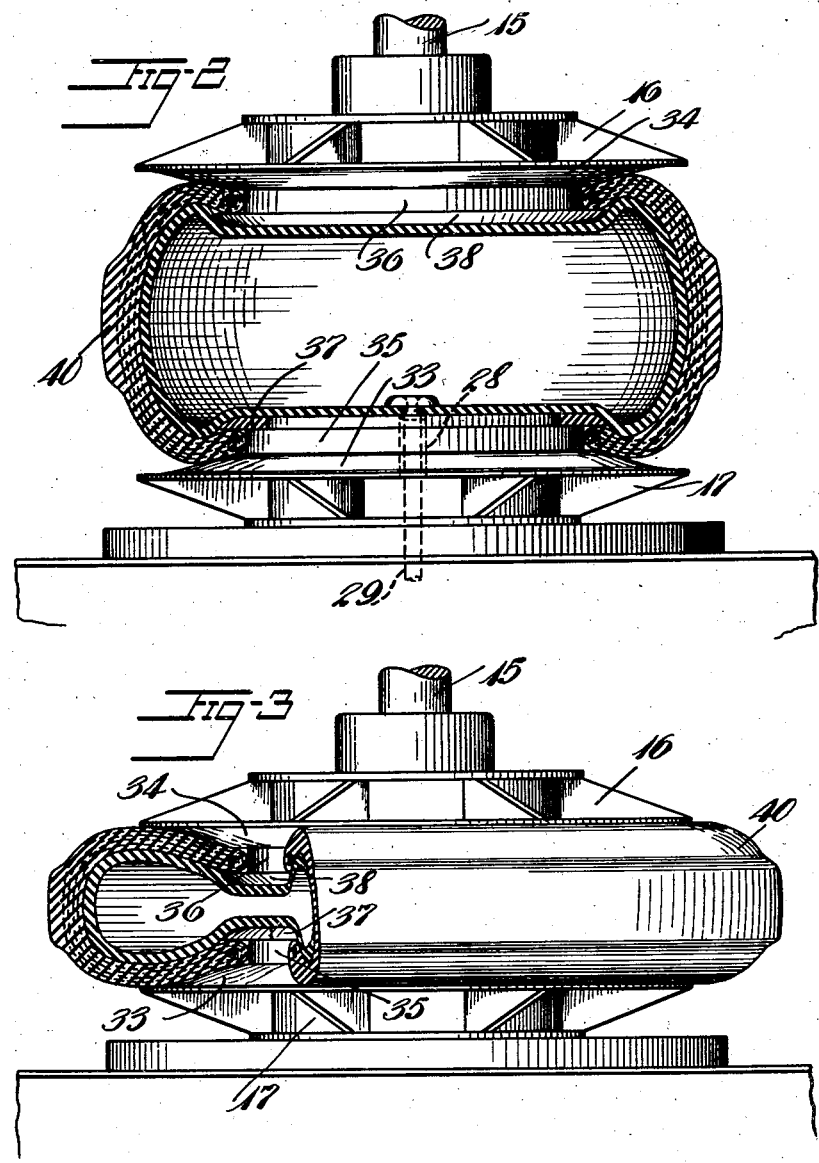

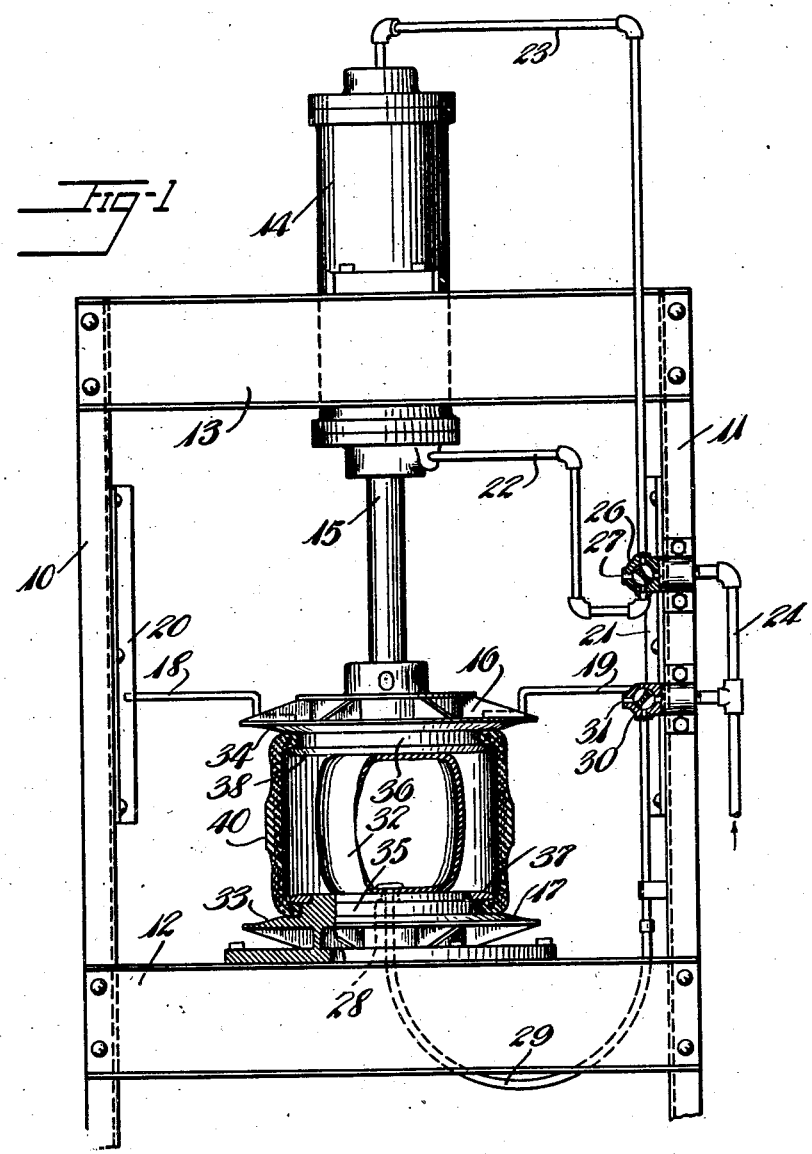

Patented Feb. 13, 1934

1,947,258

UNITED STATES PATENT OFFICE 1,947,258

METHOD AND APPARATUS FOR FORMING TIRES

Vincent B. Gay, Clinton, Ohio, assignor to The B. F. Goodrich Company, New York, N. Y., a corporation of New York Application May 3, 1932. Serial No. 608,915

4 Claims. (Cl. 154—9)

This invention relates to methods of forming tires and to apparatus for performing the same. More especially the invention relates to the forming of tires by differential pressure after the tires have been built in generally cylindrical form by the flat band method. The invention is especially useful in the manufacture of tires having a large cross-sectional area and of small bead diameter.

The principal objects of the invention are to provide uniformity of product and facility of manufacture, to prevent undesirable deformation of the side walls and beads in the shaping of the tire, and to provide for positive shaping of the side walls.

Other objects will appear from the following description and the accompanying drawings.

In the drawings:

Fig. 1 is an elevation, partly in section, showing the forming apparatus with a tire therein, the initial position of the parts being illustrated.

Fig. 2 is a similar view of the forming instrumentalities and tire to an enlarged scale, showing the tire partly formed, the tire and forming bag being shown in section and the pressure means being broken away.

Fig. 3 is a view similar to Fig. 2 but showing the forming operation as completed, part of the tire being broken away.

Referring to the drawings, the numerals 10 and 11 designate vertical frame members connected by cross frame members 12 and 13. Cross frame member 13 supports a fluid pressure cylinder 14 in which is located a piston connected to a vertically disposed piston rod 15 to the lower end of which is secured a forming plate 16. A similar forming plate 17 is supported by frame member 12 in opposed relation thereto.

Guide rods 18, 19, carried by the forming plate 16, slidably engage guideways 20 and 21 fixed to frame members 10 and 11.

Pressure fluid for supplying the cylinder 14 is admitted thereto through pipes 22 and 23 which may be alternately supplied from a fluid pressure line 24 by a valve 26 having an exhaust port 27, the arrangement being such that when one end of the cylinder is connected to the line 24, the other end is connected to the exhaust port 27.

Forming plate 17 is provided with a central opening 28 through which a flexible fluid conduit 29 extends. A valve 30 is adapted to supply fluid under pressure to the conduit 29 from the line 24 or to connect the conduit to an exhaust port 31. An expansible elastic forming bag 32 which rests on forming plate 17 is connected to the conduit 29.

Forming plates 16 and 17 are of circular form and their outer annular faces 33 and 34 are shaped to the contour of the side wall of the finished tire. Within such annular faces they are provided with projecting bosses 35 and 36 of diameter slightly less than the bead diameter of the tire and of such depth as to provide bead supporting shoulders of greater width than that of the beads of the tire.

A detachable ring 37 is dowelled to the boss 35 and is of such diameter as to project over the beads of a tire mounted on said boss and prevent contact of the pressure bag 32 therewith. Boss 36 is similarly provided with a removable disc 38 of similar diameter.

In the operation of the device the tire 40, which has been built to cylindrical shape with internal beads, as illustrated in Fig. 1, is distorted slightly from circular form and the ring 37 and disc 38 are placed therein. The tire is now adjusted with one of its beads over the boss 35, the ring 37 being located in proper position. The forming bag being in place as shown in Fig. 1, the plate 38 is supported thereby against the bead at the upper margin of the tire. Plate 16 is then lowered, by admitting pressure fluid through pipe 23, until its boss 36 is properly entered within the upper bead of the tire.

Air or other pressure fluid is now admitted through conduits 29 to bag 32 which is expanded into tire contacting relation. Thereupon pressure fluid is admitted concurrently to the bag 32 and cylinder 14 thereby causing plate 34 to be lowered and the tire to be simultaneously expanded to the shape illustrated in Fig. 3, the side walls of the tire progressively rolling outwardly into contact with the shaped flanges 33 and 34 and pressed thereagainst.

During the forming movement the beads of the tire, being loosely enclosed by the channels defined by the forming plates and the projecting ring 37 and plate 38, and protected from contact with the bag 32 by said ring and plate, are free to adjust themselves to proper position and buckling of the fabric layers around the beads is prevented.

The ring 37 and plate 38 also prevent the pressure bag 32 from entering under the beads and thereby prevent injurious pinching of the bag or injurious deforming of the beads. This permits the use of highly elastic thin rubber forming bags which require less pressure, are easily inserted through the bead openings of tires having small bead diameters, and more uniformly stretch the tire.

After the tire is formed the valves 26 and 30 are reversed and pressure fluid from the bag 32 escapes through the exhaust 31 whereas pressure fluid is admitted to the lower end of cylinder 14 and allowed to exhaust from the upper end thereof.

I claim:

1. Apparatus for forming tires, said apparatus comprising a pair of forming plates adapted to confine the bead portions of a tire without clamping the same, means for positively moving them toward each other, an elastic forming bag located between said plates and confined only by said plates and the tire, and means for inflating the bag.

2. Apparatus for forming tires, said apparatus comprising a pair of annular forming plates, means for moving them toward each other, an expansible forming bag located between said forming plates, means for inflating said bag, and means carried by said forming plates for overlying the beads of the tire and preventing contact of the forming bag therewith.

3. Apparatus for forming tires, said apparatus comprising a pair of annular forming plates, an expansible forming bag located therebetween, means for simultaneously moving said plates toward each other and inflating said bag to form a tire, and means carried by said plates for overlying the beads of the tire and preventing contact of the forming bag therewith.

4. The method of forming tires which comprises expanding the tire by pressure applied from within the tire and forcing the bead portions thereof toward each other while shielding the beads from confining pressure.

VINCENT B. GAY.